US011097780B2

(12) United States Patent
Hasegawa et al.

(10) Patent No.: US 11,097,780 B2
(45) Date of Patent: Aug. 24, 2021

(54) VEHICLE BODY REAR STRUCTURE (71) Applicant: HONDA MOTOR CO., LTD., Tokyo (JP)

(72) Inventors: Atsushi Hasegawa, Wako (JP); Koji Yoshikawa, Wako (JP); Yusuke Miura, Yamato (JP); Ryota Yamane, Tokyo (JP); Tomohiro Shimizu, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 86 days.

(21) Appl. No.: 16/658,602

(22) Filed: Oct. 21, 2019

(65) Prior Publication Data

US 2020/0130747 A1 Apr. 30, 2020

(30) Foreign Application Priority Data

Oct. 24, 2018 (JP) .............................. JP2018-200284

(51) Int. Cl.
*B62D 21/15* (2006.01)
*B62D 21/02* (2006.01)
*B62D 25/08* (2006.01)

(52) U.S. Cl.
CPC ........... *B62D 21/155* (2013.01); *B62D 21/02* (2013.01); *B62D 21/15* (2013.01); *B62D 25/08* (2013.01)

(58) Field of Classification Search
CPC ...... B62D 21/155; B62D 21/02; B62D 25/08; B62D 21/15
USPC ...................................... 296/187.09
See application file for complete search history.

(56) References Cited

U.S. PATENT DOCUMENTS

2017/0057548 A1\* 3/2017 Yamada ............... B62D 21/152
2017/0291644 A1\* 10/2017 Hasegawa ............. B62D 25/20

FOREIGN PATENT DOCUMENTS

JP        H05105110 A      4/1993

\* cited by examiner

*Primary Examiner* — D Glenn Dayoan
*Assistant Examiner* — Dana D Ivey
(74) *Attorney, Agent, or Firm* — Armstrong Teasdale LLP

(57) ABSTRACT

Each rear side member (4) of a vehicle body rear structure includes a first deformable portion (41), a second deformable portion (42), a third deformable portion (43), and a fourth deformable portion (44) in that order from a rear end thereof on an inboard side and an outboard side in an alternating manner and in a mutually spaced apart relationship, and the distances between the adjacent deformable portions are substantially 1:2:1:1 in ratio as measure from the rear end of the rear side member.

7 Claims, 7 Drawing Sheets

VEHICLE BODY REAR STRUCTURE

TECHNICAL FIELD

The present invention relates to a vehicle body rear structure having a pair of side members extending along either side of a vehicle body.

BACKGROUND ART

JPH05-105110A discloses a side member forming a front part of a vehicle body. A plurality of vertically extending and inwardly recessed beads are formed on the outboard side and the inboard side thereof at a regular interval. The beads on the outboard side are offset with respect to the beads on the inboard side by one half of the distance between the two adjoining beads. When the side member is subjected to a loading of a frontal crash, the side member bends at the beads so as to form a valley while the parts of the side member located between the beads are left relatively straight. By thus causing the side member to bend in a zig zag pattern, the impact load is favorably absorbed, and the occupant is protected from the impact load.

To protect the vehicle occupant from an impact load of a frontal crash or a rear end crash, it is preferable that the bending deformation is initiated from the front or the rear end of each side member. More specifically, each side member is preferably configured such that only the front end or the rear end of the side member undergoes the bending deformation when the impact load is not great, and the bending deformation occurs over the entire length of each side member when the impact load is great. However, according to the side member disclosed in JPH05-105110A, the beads are arranged at a regular interval so that where the bending deformation will be initiated at the time of a frontal crash is highly unpredictable. Therefore, it is possible that the part of each side member adjacent to the vehicle occupant undergoes a bending deformation earlier than the remaining part of the side member.

SUMMARY OF THE INVENTION

In view of such a problem of the prior art, a primary object of the present invention is to provide a vehicle body rear structure including a pair of rear side members in which a bending deformation is initiated in a part of each rear side member remote from a vehicle occupant at the time of a rear end crash.

To achieve such an object, the present invention provides a vehicle body rear structure (1) including a pair of rear side members (4) extending in a fore and aft direction along either side of a vehicle body (2), wherein each rear side member includes a first deformable portion (41), a second deformable portion (42), a third deformable portion (43), and a fourth deformable portion (44) in that order from a rear end thereof on an inboard side and an outboard side in an alternating manner and in a mutually spaced apart relationship, and a distance (L2) between the first deformable portion and the second deformable portion is greater than any of a distance (L1) between the rear end of the rear side member and the first deformable portion, a distance (L3) between the second deformable portion and the third deformable portion, and a distance (L4) between the third deformable portion and the fourth deformable portion.

The section of the rear side member located between the adjacent deformable portions and having the largest overall length is provided in the part of the vehicle body remote from the vehicle occupant, and tends to remain straight as opposed to the deformable portions. Therefore, the axial force that is applied to the rear side member at the time of a rear end crash tends to cause a relatively large bending moment at the two ends of this straight section so that the bending deformation of the rear side member at the time of a rear end crash occurs in a designed sequence, and the impact load can be absorbed in an optimum fashion.

Preferably, the distance between the rear end of the rear side member and the first deformable portion, the distance between the first deformable portion and the second deformable portion, the distance between the second deformable portion and the third deformable portion, and the distance between the third deformable portion and the fourth deformable portion are substantially 1:2:1:1 in ratio.

Thereby, the lateral deflection of the rear side frame at the time of a rear end crash occurs in alternating directions along the length thereof so that an excessive lateral deflection of the rear side frame can be avoided as the rear side member collapses in the axial direction. Thereby, the impact load can be absorbed in an efficient manner without causing a part of the rear side member to intrude into the cabin of the vehicle.

Preferably, each rear side member is formed as a tubular member having a rectangular cross section so as to have a pair of ridge lines (29) on an inboard side and another pair of ridge lines (30) on an outboard side, the first deformable portion and the third deformable portion extend through the ridge lines on the inboard side, and the second deformable portion and the fourth deformable portion extend through the ridge lines on the outboard side.

Since each deformable portion passes through the ridge lines either on the inboard side or the outboard side, the deformable portions are ensured to undergo a bending deformation in a reliable manner.

Preferably, a front edge of the second deformable portion on an upper wall of the rear side member is inclined rearward toward the inboard side, and a rear edge of the third deformable portion on the upper wall of the rear side member is inclined forward toward the outboard side, the front edge of the second deformable portion and the rear edge of the third deformable portion being spaced apart from each other in the fore and aft direction in a mutually parallel relationship.

Thereby, when an axial load is applied to the rear side member at the time of a rear end crash, a bending moment is created in the second deformable portion and the third deformable portion in a highly reliable manner so that the rear side member is allowed to deform in a predictable manner.

Preferably, each rear side member is made of metallic material, and each deformation portion consists of a softened portion of the rear side member.

Thereby, the deformable portions can be formed without forming any ribs, openings, or any other mechanical features so that any undesired weak spots are prevented from being created, and opening for fasteners can be formed without being interfered by any such mechanical features. The deformable portions may be formed by performing a thermal processing in a different way from the remaining part of the rear side member.

Preferably, the rear side members are symmetric to each other.

Thereby, the impact load at the time of a rear end crash can be distributed between the two rear side members.

Another aspect of the present invention provides a vehicle body rear structure (1) including a pair of rear side members (4) extending in a fore and aft direction along either side of a vehicle body (2), wherein each rear side member includes a first deformable portion (81), a second deformable portion (42), a third deformable portion (43), and a fourth deformable portion (44) in that order from a rear end thereof in a mutually spaced apart relationship, and the first deformable portion extends over an entire circumference of the rear side member, the second deformable portion, the third deformable portion, and the fourth deformable portion being provided on an inboard side and an outboard side in an alternating manner, a distance (M2) between the first deformable portion and the second deformable portion is greater than any of a distance (M1) between the rear end of the rear side member and the first deformable portion, a distance (L3) between the second deformable portion and the third deformable portion, and a distance (L4) between the third deformable portion and the fourth deformable portion.

At the time of a rear end crash, the rear end part of the rear side member is subjected to a greater axial load than more forward parts of the rear side member. Therefore, by having the first deformable portion extend over the entire circumference of the rear side member, and providing a comparatively large size to the first deformable portion, the impact load of a rear end crash can be particularly favorably absorbed. In this case also, it is preferred that the distance between the rear end of the rear side member and the first deformable portion, the distance between the first deformable portion and the second deformable portion, the distance between the second deformable portion and the third deformable portion, and the distance between the third deformable portion and the fourth deformable portion are substantially 1:2:1:1 in ratio.

The present invention thus provides a vehicle body rear structure including a pair of rear side members in which a bending deformation is initiated in a part of each rear side member remote from a vehicle occupant at the time of a rear end crash.

DESCRIPTION OF THE PREFERRED EMBODIMENT(S)

Preferred embodiments of the present invention are described in the following with reference to the appended drawings. The directions mentioned in the following disclosure will be based on the view point of the driver of the vehicle. Since the vehicle body described in the following is symmetric about a longitudinal center line, only one side of the vehicle body may be described in the following disclosure to avoid redundancy.

First Embodiment

Figure 1:
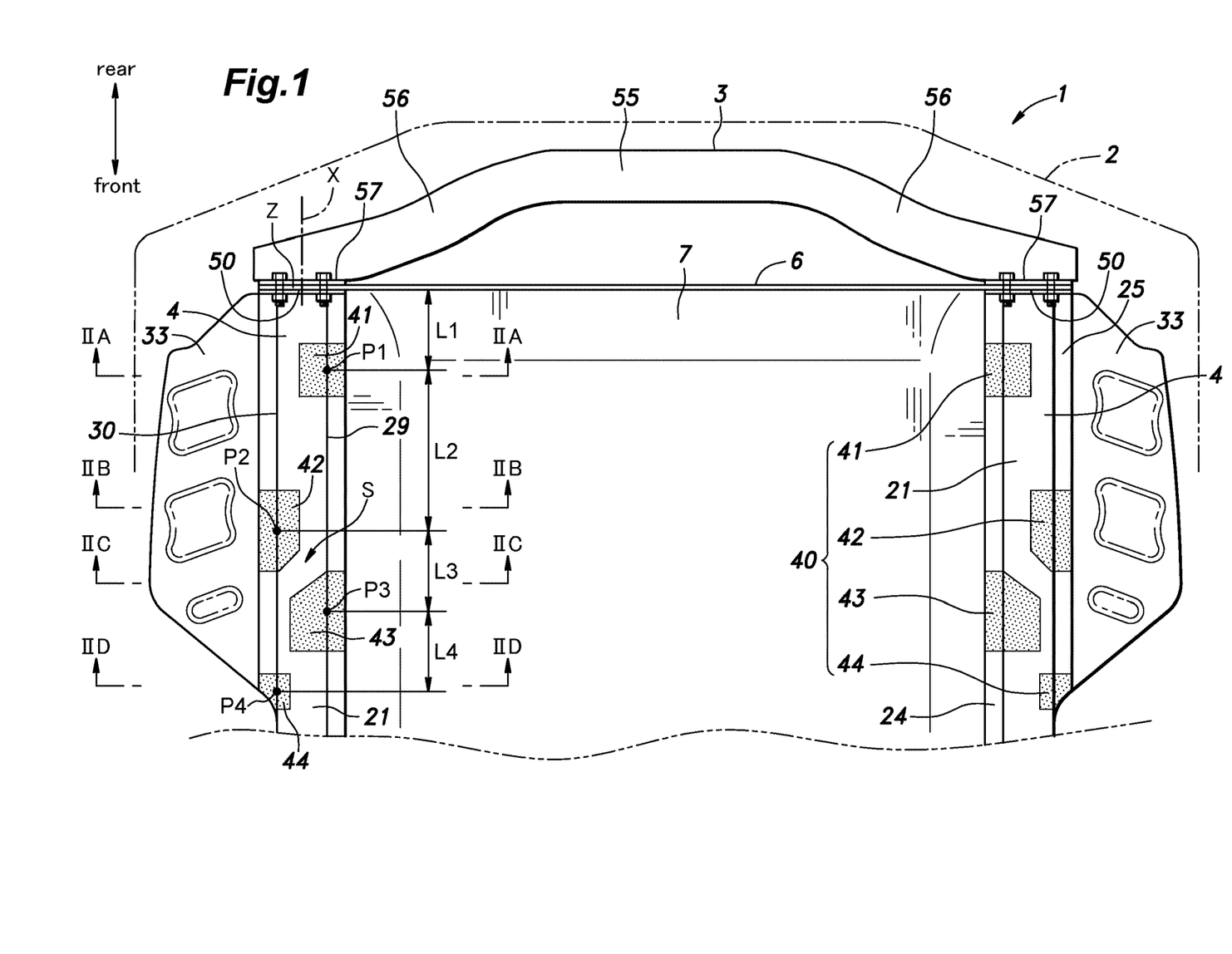
FIG. 1 is a plan view of a vehicle body rear structure according to a first embodiment of the present invention.

As shown in FIG. 1, the vehicle body rear structure 1 according to an embodiment of the present invention includes a rear bumper beam 3 extending laterally in a rear end part of the vehicle body 2, and a pair of rear side members 4 extending along either side of the vehicle body and having rear ends joined to the respective lateral end parts of the rear bumper beam 3.

The vehicle body rear structure 1 further includes rear panel 6 having a major plane facing in the fore and aft direction, and having lateral ends interposed between the rear ends of the rear side members 4 and the opposing parts of the rear bumper beam 3, respectively, and a floor panel 7 having a major plane facing vertically and extending between the rear side members 4.

As shown in FIGS. 2A to 2D, the rear side member 4 includes a lower member 11 having a U-shaped cross section and having an open side facing upward, and an upper member 12 having a U-shaped cross section and having an open side facing downward. The lower member 11 includes a lower wall 15 extending substantially horizontally, a lower inner side wall 16 extending vertically upward from the inboard edge of the lower wall 15, a lower outer side wall 17 extending vertically upward from the outboard edge of the lower wall 15, a lower inner flange 18 extending in the inboard direction from the upper edge of the lower inner side wall 16, and a lower outer flange 19 extending in the outboard direction from the upper edge of the lower outer side wall 17.

The upper member 12 includes an upper wall 21 extending substantially horizontally, an upper inner side wall 22 extending vertically downward from the inboard edge of the upper wall 21, an upper outer side wall 23 extending vertically downward from the outboard edge of the upper wall 21, an upper inner flange 24 extending in the inboard direction from the upper edge of the upper inner side wall 22, and a upper outer flange 25 extending in the outboard direction from the upper edge of the upper outer side wall 23.

The upper member 12 is joined to the lower member 11 by attaching the upper inner flanges 24 to the lower inner flange 18 and the upper outer flange 25 to the lower outer flange 19 by spot welding so that the rear side member 4 is formed as a tubular member having a rectangular cross section and internally defining an inner bore 32 of a rectangular cross section. The four walls of the rectangular cross section are referred to as an upper wall 21, a lower wall 15, an inner vertical wall 27 located on the inboard side of the vehicle, and an outer vertical wall 28 located on the outboard side of the vehicle. The rear side member 4 thus have a pair of ridge lines 29 on the inboard side extending along the upper edge and the lower edge of the inner vertical wall 27, and a pair of ridge lines 30 on the outboard side extending along the upper edge and the lower edge of the outer vertical wall 28.

However, the shapes of the upper member 12 and the lower member 11 forming the rear side member 4 are not limited to those of the illustrated embodiment, but the rear side member 4 may consist of any other structure having a rectangular cross section and defining a hollow interior having a rectangular cross section.

In the illustrated embodiment, the side edge the floor panel 7 is interposed between the upper inner flange 24 and the lower inner flange 18, and is jointly welded to the upper inner flange 24 and the lower inner flange 18. In the illustrated embodiment, the vehicle body rear structure further includes an auxiliary panel 33 which extends substantially horizontally along the outboard side of the rear side member 4, and the inboard edge of the auxiliary panel 33 is interposed between the lower outer flange 19 and the upper outer flange 25, and is jointly welded to the lower outer flange 19 and the upper outer flange 25. However, the method of joining the floor panel 7 and the rear side member 4 is not limited to this method, but may be joined by any other per se known method.

Deformable portions 40 are provided in selected parts of the rear side member 4 as indicated by the halftone areas in FIGS. 1, and 2A to 2D. Each deformable portion 40 is configured to be more readily deformable (or to be deformed under a lighter load) than the remaining part of the rear side member 4 by suitably altering the metallic property of the deformable portion 40, using a different material from that used in the remaining part of the rear side member 4 or locally reducing the wall thickness of the deformable portion 40.

As shown in FIG. 1, the deformable portions 40 include a first deformable portion 41, a second deformable portion 42, a third deformable portion 43, and a fourth deformable portion 44.

Figure 2A:
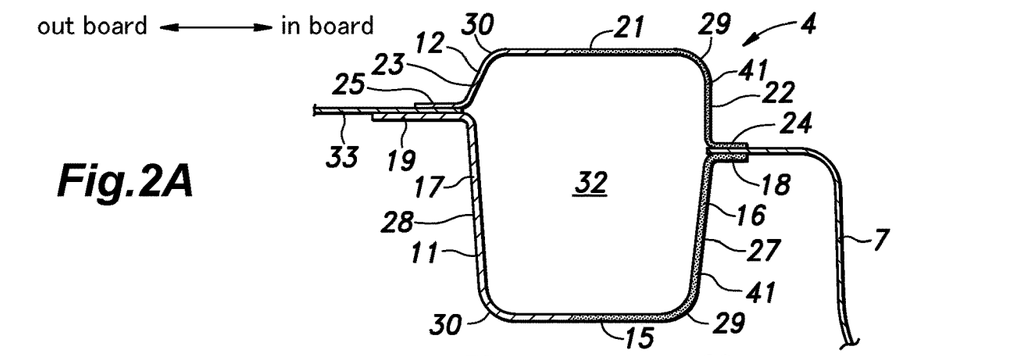
FIG. 2A is a sectional view taken along line IIA-IIA of FIG. 1.

As shown in FIGS. 1 and 2A, the first deformable portion 41 extends over the entire height of the inner vertical wall 27 (including the upper inner flange 24 and the lower inner flange 18), and therefrom to a middle point of the upper wall 21 and to a middle point of the lower wall 15, via the ridge lines 29 on the inboard side. In other words, the first deformable portion 41 extends over the inboard half of the rear side member 4.

As shown in FIGS. 1 and 2A, the front edge and the rear edge of the first deformable portion 41 each extend along a plane orthogonal to the axial direction of the rear side member 4. Thus, the first deformable portion 41 is rectangular in shape in top view, side view, bottom view and developed view. In FIG. 1, a middle point of the part of the first deformable portion 41 corresponding to the upper inner ridge line 29 with respect to the fore and aft direction is indicated by letter P1.

Figure 2B:
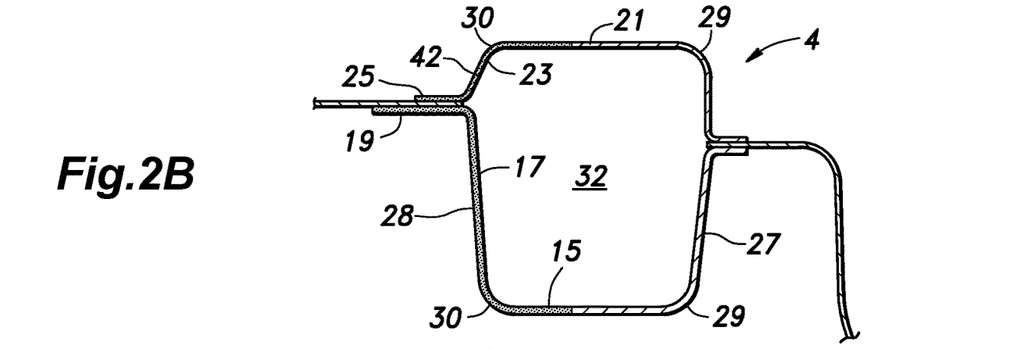
FIG. 2B is a sectional view taken along line IIB-IIB of FIG. 1.

As shown in FIGS. 1 and 2B, the second deformable portion 42 extends over the entire height of the outer vertical wall 28 (including the upper outer flange 25 and the lower outer flange 19), and therefrom to a middle point of the upper wall 21 and to a middle point of the lower wall 15, via the ridge lines 30 on the outboard side.

As shown in FIGS. 1 and 2B, the rear edge of the second deformable portion 42 extends along a plane orthogonal to the axial direction of the rear side member 4. The front edge of the second deformable portion 42 extends vertically along the outer vertical wall 28 (including the upper outer flange 25 and the lower outer flange 19), and extends obliquely in an inboard and rearward direction to a laterally middle point of the upper wall 21 of the rear side member 4. The inboards edges of the second deformable portion 42 on the upper wall 21 and the lower wall 15 both extend in the fore and aft direction or along the axial line of the rear side member 4. The part of the second deformable portion 42 in the lower wall 15 is conformal the part of the second deformable portion 42 in the upper wall 21 in plan view. Thus, the second deformable portion 42 is rectangular in side view, and trapezoidal in top view and bottom view. In FIG. 1, a middle point of the part of the second deformable portion 42 corresponding to the upper outer ridge line 30 on the outboard side with respect to the fore and aft direction is indicated by letter P2.

Figure 2C:
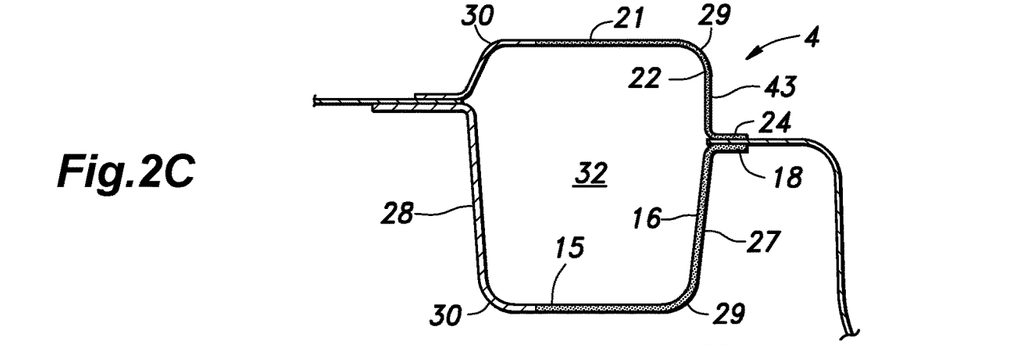
FIG. 2C is a sectional view taken along line IIC-IIC of FIG. 1.

As shown in FIGS. 1 and 2C, the third deformable portion 43 extends over the entire height of the inner vertical wall 27 (including the upper inner flange 24 and the lower inner flange 18), and therefrom to a middle point of the upper wall 21 and to a middle point of the lower wall 15, via the ridge lines 29 on the inboard side.

As shown in FIGS. 1 and 2C, the front edge of the third deformable portion 43 extends along a plane orthogonal to the axial direction of the rear side member 4. The rear edge of the second deformable portion 42 extends vertically along the inner vertical wall 27 (including the upper inner flange 24 and the lower inner flange 18), and extends obliquely in an outboard and forward direction to a laterally middle point of the upper wall 21 of the rear side member 4. The outboard edges of the second deformable portion 42 on the upper wall 21 and the lower wall 15 both extend in the fore and aft direction or along the axial line of the rear side member 4. The parts of the third deformable portion 43 in the upper wall 21 and the lower wall 15 are conformal to each other in plan view. Thus, the third deformable portion 43 is rectangular in side view, and trapezoidal in top view and bottom view. In FIG. 1, a middle point of the part of the third deformable portion 43 corresponding to the upper inner ridge line 29 with respect to the fore and aft direction is indicated by letter P3.

Figure 2D:
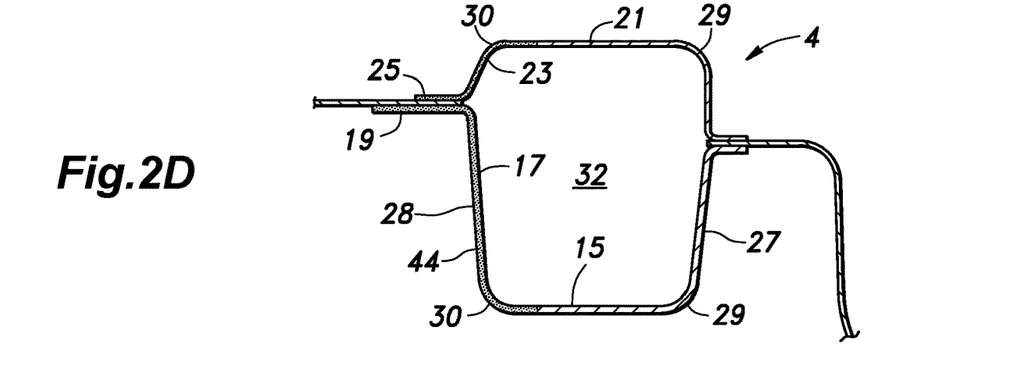
FIG. 2D is a sectional view taken along line IID-IID of FIG. 1.

As shown in FIGS. 1 and 2D, the fourth deformable portion 44 extends over the entire height of the outer vertical wall 28 (including the upper outer flange 25 and the lower outer flange 19), and therefrom to a middle point of the upper wall 21 and to a middle point of the lower wall 15, via the ridge lines 30 on the outboard side. In other words, the fourth deformable portion 44 extends over the outboard half of the rear side member 4.

As shown in FIGS. 1 and 2D, the front edge and the rear edge of the first deformable portion 41 each extend along a plane orthogonal to the axial direction of the rear side member 4. Thus, the fourth deformable portion 44 is rectangular in shape in top view, side view, bottom view and developed view. In FIG. 1, a middle point of the part of the fourth deformable portion 44 corresponding to the upper outer ridge line 30 with respect to the fore and aft direction is indicated by letter P4.

A fore and aft distance L1 between the rear end of the rear side member 4 (indicated by letter Z in FIG. 1) and P1, the fore and aft distance L2 between P1 and P2, the fore and aft distance L3 between P2 and P3, and the fore and aft distance L3 between P3 and P4 are substantially 1:2:1:1 in ratio. In the illustrated embodiment, the widths of the second deformable portion 42 and the third deformable portion 43 in the fore and aft direction are substantially equal to each other, and are greater than those of the first deformable portion 41 and the fourth deformable portion 44 in the fore and aft direction. On each of the upper wall 21 and the lower wall 15, the obliquely extending front edge of the second deformable portion 42 opposes the obliquely extending rear edge of the third deformable portion 43 in a substantially parallel relationship. Therefore, an obliquely extending band S of material which is relatively resistant to deformation is created between the second deformable portion 42 and the third deformable portion 43. In the illustrated embodiment, the rear edge of the second deformable portion 42 and the front edge of the third deformable portion 43 each extend in the lateral direction with respect to the vehicle body.

As shown in FIG. 1, in the illustrated embodiment, an upper rear flange 50 extends upward from the rear edge of the upper wall 21, and a lower rear flange extends downward from the rear edge of the lower wall 15. Each of the upper rear flange 50 and the lower rear flange is provided with bolt holes in suitable parts thereof.

The rear panel 6 extends both laterally and vertically. The rear panel 6 is provided with bolt holes at positions corresponding to the bolt holes provided in the upper rear flange 50 and the lower rear flange.

The rear bumper beam 3 consists of a hollow beam member having a rectangular cross section and extending generally laterally. The rear bumper beam 3 may be formed, for instance, by roll forming aluminum or an aluminum alloy. The rear bumper beam 3 is symmetric about a central longitudinal line of the vehicle body, and bent or curved forward in each lateral end part thereof. The rear bumper beam 3 thus includes a laterally extending central part 55, and a pair of obliquely extending laterally outer parts 56 each bent or curved forward toward the lateral end part thereof.

The laterally outer end part of the laterally outer part 56 of the rear bumper beam 3 is provided with a rectangular opening facing forward, an upper front flange 57 extending upward from the upper edge of this opening, and a lower flange (not shown in the drawings) extending downward from the lower edge of this opening. Each of the upper front flange 57 and the lower front flange is provided with bolt holes in suitable parts thereof. The upper rear flange 50, the rear panel 6 and the upper front flange 57 are fastened to each other, and the lower rear flange, the rear panel 6, and the lower front flange are fastened to each other, by threaded bolts that are passed through the corresponding bolt holes in each case. Thereby, the rear bumper beam 3, the rear panel 6, and the rear side member 4 are integrally joined to one another.

Figure 3:
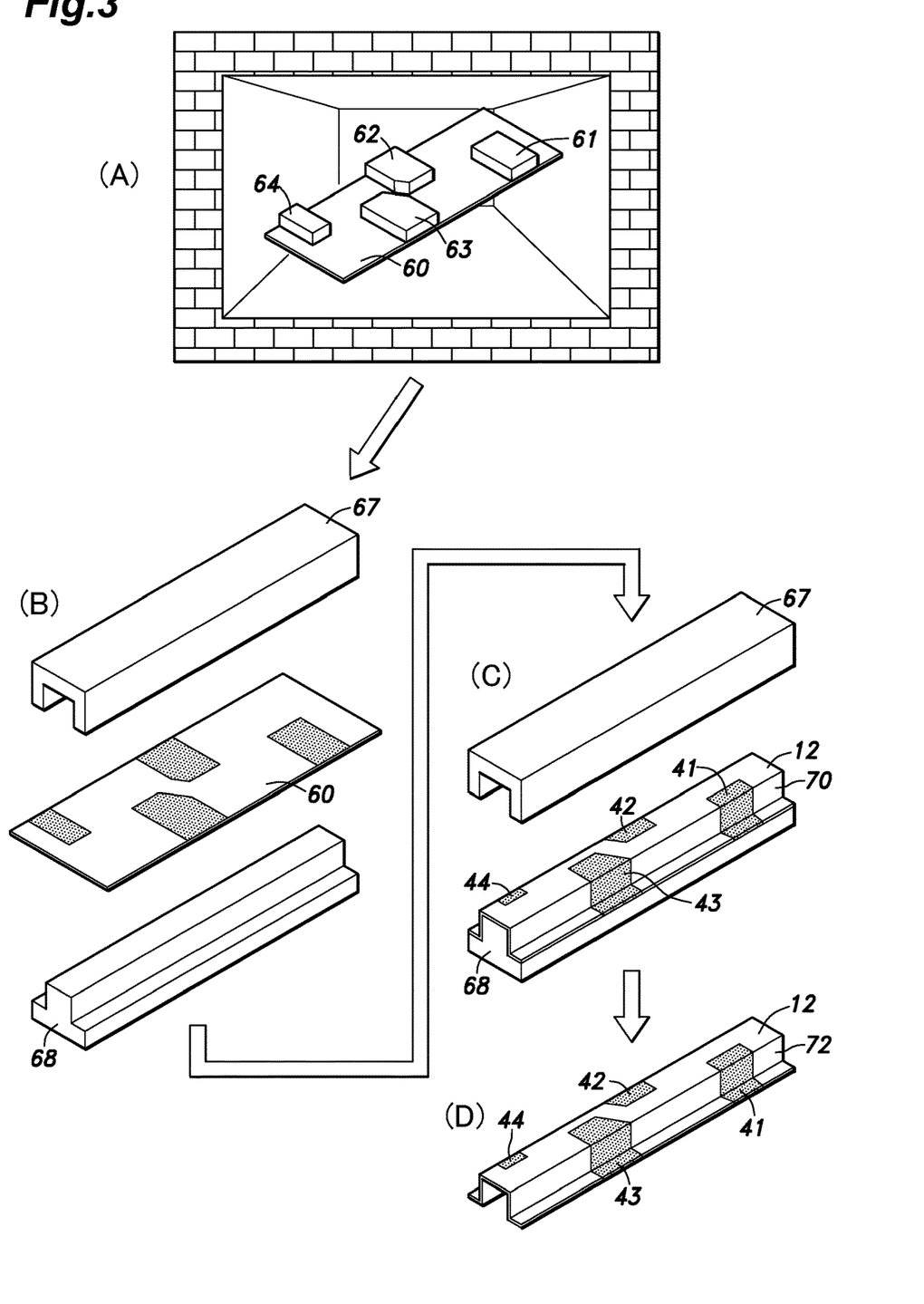
FIG. 3 is a diagram illustrating the manufacturing steps (A) to (D) of a rear side member.

The mode of preparing the upper member 12 and the lower member 11 of the rear side member is discussed in the following with reference to FIG. 3. As shown in (A) of FIG. 3, first of all, a strip of sheet steel 60 is cut into predetermined shapes corresponding to the upper member 12 and the lower member 11. The sheet steel 60 (which may be the material for either the upper member 12 or the lower member 11) is heated to a prescribed temperature in an oven. During this heating process, the parts of the sheet steel 60 corresponding to the first to fourth deformable portions 41, 42, 43 and 44 are locally shielded by the plurality of heat shielding members 61 to 64 which correspond to the first to fourth deformable portions 41, 42, 43 and 44 in shape, respectively.

Following this heating process, the sheet steel 60 is stamp formed into the corresponding shape by using stamp forming dies 67 and 68 as shown in (B). The sheet steel 60 stamp formed into the corresponding shape is then removed from the stamp forming dies 67 and 68 as shown in (C), and the upper member 12 or the lower member 11 is thus formed as shown in (D).

By thermally processing this way, the first to fourth deformable portions 41, 42, 43, and 44 of the upper member 12 or the lower member 11 have a lower temperature than the remaining part of the upper member 12 or the lower member 11 when stamp formed. Therefore, whereas the remaining part of the upper member 12 or the lower member 11 is quenched by coming into contact with the dies during the stamp forming process, the first to fourth deformable portions 41, 42, 43 and 44 are not quenched, and are thereby given with a lower rigidity and a lower mechanical strength. As a result, the first to fourth deformable portions 41, 42, 43 and 44 of the rear side member 4 have a tensile strength of 400 MPa to 700 MPa, and a Vickers hardness of 180 Hv to 220 Hv as measured according to Japanese Industrial Standard JIS Z 2244.

In the present embodiment, the tensile strength is 560 MPa to 620 MPa, and the Vickers hardness is 200 Hv to 220 Hv in the entire region of the first to fourth deformable portions 41, 42, 43 and 44. On the other hand, the parts other than the first to fourth deformable portions 41, 42, 43 and 44 are hardened, and are given with a higher hardness and a higher rigidity. In particular, the parts of the rear side member 4 located between the adjoining deformable portions 41, 42, 43 and 44 (i.e., the part located between the first deformable portion 41 and the second deformable portion 42, the part located between the second deformable portion 42 and the third deformable portion 43, and the located between the third deformable portion 43 and the fourth deformable portion 44), as well as the part located between rear end of the rear side member 4 and the first deformable portion 41 are given with a tensile strength of 1,200 MPa to 1,800 MPa.

Next, the features and advantages of the vehicle body rear structure 1 configured as described above will be discussed in the following with reference to FIG. 4 which shows a deformation process of a rear end part of the rear side member at different time points (A) to (B) following a rear end crash. This was obtained from a computer simulation where it was assumed that the tensile strength of the deformable portions 40 is 560 MPa, and the tensile strength of the remaining part is 1,500 MPa.

At the time of a rear end crash, the rear end of the rear side member 4 is subjected to an impact load directed in the forward direction. At such a time, the rear side member 4 bends laterally, but it is desirable for the rear side member 4 not to deflect in one direction, in an outboard direction or an inboard direction. In order to maximally absorb the impact load, it is desirable for the rear side member 4 to collapse in the axial or longitudinal direction by bending by small deflections in alternating lateral directions along a certain length thereof.

Figure 4A:
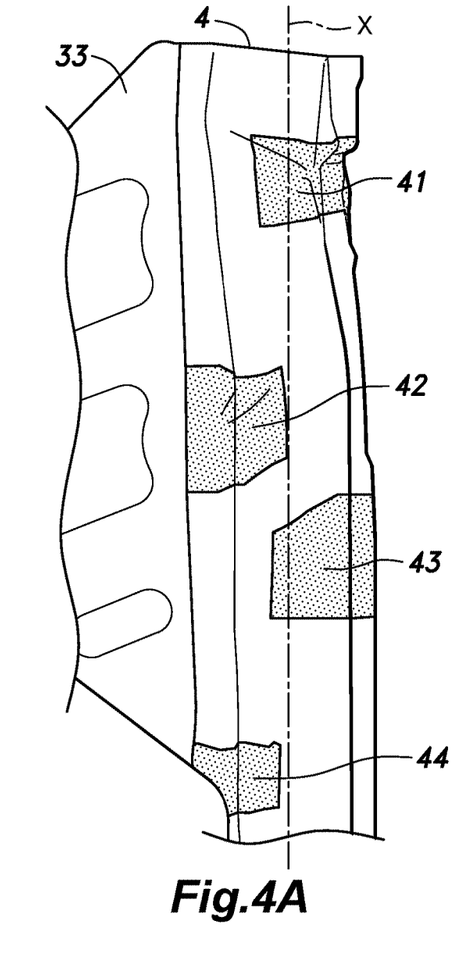
FIG. 4A is a diagram illustrating the deformation process of a rear end part of the rear side member at time point A following a rear end crash.
Figure 4B:
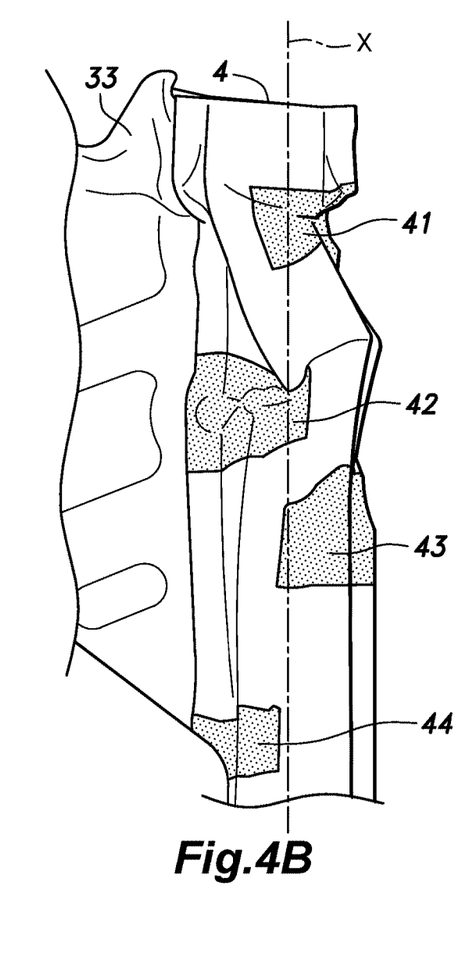
FIG. 4B is a diagram illustrating the deformation process of a rear end part of the rear side member at time point B following a rear end crash.
Figure 4C:
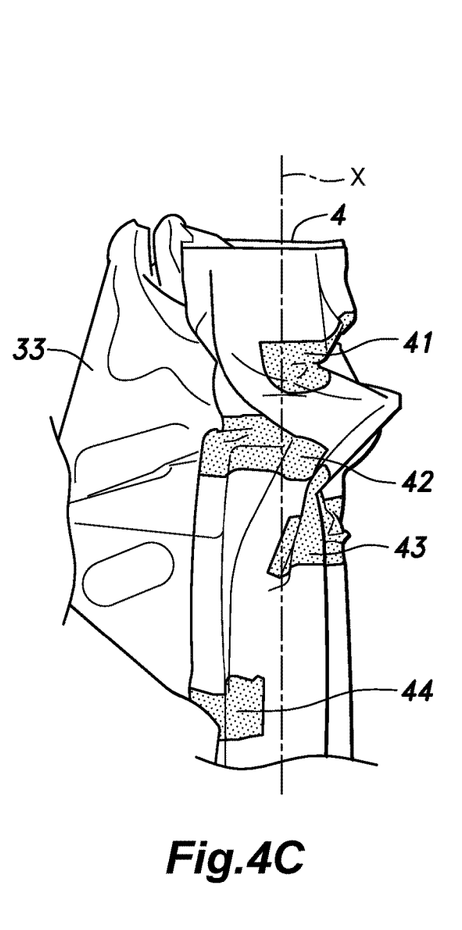
FIG. 4C is a diagram illustrating the deformation process of a rear end part of the rear side member at time point C following a rear end crash.

As shown in FIG. 4, the parts of the rear side member 4 located between the two adjoining deformable portions 40 have a higher tensile strength than the deformable portions 40 so that when the rear side member 4 is subjected to an axial force, the deformable portions 40 tend to bend more readily as compared to the remaining parts of the rear side member 4. Thus, the bends in the rear side member 4 occur in the deformable portions 40 while the remaining parts located between the two adjoining deformable portions 40 tend to stay straight.

Owing to the positioning of the points P1, P2, P3 and P4 such that the distances between these points are in the 1:2:1:1 ratio as measured from the rear end of the rear side member 4, the bending deformation of the rear side member 4 takes place as illustrated in FIG. 4. More specifically, in an early phase of a rear end crash, as shown in (A) of FIG. 4, the resulting axial force causes the straight section between the first deformable portion 41 and the second deformable portion 42 and the straight section between the second deformable portion 42 and the third deformable portion 43 to tilt such that the junction between these two straight sections is displaced in the inboard direction. This deformation pattern is promoted by the relatively large distance between points P1 and P2. Since the relatively large lateral deflection or displacement of the rear side member occurs in the junction between the two straight sections (substantially corresponding to P2), the occupant who is normally positioned well ahead of this position can be prevented from coming into contact with the part of the rear side member 4 deflecting in the inboard direction to a relatively significant extent.

As shown in (B) of FIG. 4, as the collapsing of the rear side member 4 progresses further under the axial load, a bending deformation progresses also at the first deformable portion 41, the third deformable portion 43 and the fourth deformable portion 44 such that the deflection of the rear side member 4 in the outboard direction occurs in the first deformable portion 41 and the third deformable portion 43 owing to the progress of the bending deformation in these deformable portions. As a result, the rear end part of the rear side member 4 is allowed to be pushed forward along a relatively straight path, and the part of the rear side member 4 extending between the rear end to the fourth deformable portion 44 are allowed to be bent in a zig zag pattern or in alternating lateral directions as shown in (C) of FIG. 4. Thus, the absorption of the impact load can be maximized while minimizing the intrusion of the rear side member 4 into the cabin of the vehicle.

The first deformable portion 41 and the third deformable portion 43 extend across the ridge lines 29 on the inboard side, and the second deformable portion 42 and the fourth deformable portion 44 extend across the ridge lines 30 on the outboard side. Therefore, in spite of the presence of the ridge lines 29 and 30, the bending deformation occurs in each of these deformable portions 40 in a reliable manner.

The deformable portions 40 are each given with a reduced rigidity by not being quenched so much as the remaining part of the rear side member 4. Thus, the variations of rigidity in the rear side member 4 are created without forming openings, ribs or other features in selected parts of the rear side member 4. Therefore, owing to the simplicity of the configuration of the rear side member 4, it is possible to predict the deformation property of the rear side member 4 in a highly precise manner. Also, the absence of openings and other features in the rear side member 4 prevents a creation any undesired weak spots, and allows the fasteners to be positioned without any undue restrictions.

In the upper wall 21, the front edge of the second deformable portion 42 and the rear edge of the third deformable portion 43 are separated from each other in the fore and aft direction, and extend at an angle to the fore and aft direction in a mutually parallel relationship. Thus, a band of material having the tensile strength in the range of 1,200 MPa to 1,800 MPa (high strength portion S) extends obliquely between the front edge of the second deformable portion 42 and the rear edge of the third deformable portion 43 in the upper wall 21. The high strength portion S is inclined in the inboard direction toward the rear part thereof in plan view. Therefore, when a rear end crash load is applied to the rear side member 4, the high strength portion S tends to be displaced so as to increase the inclination angle thereof with respect to the fore and aft direction while remaining in a relatively straight condition due to the preferential bending deformation of the second deformable portion 42 and the third deformable portion 43. As a result, the rear side member 4 is allowed to be crushed in the axial direction (the fore and aft direction) without involving any large lateral deflection.

The vehicle body rear structure includes a pair of such rear side members 4 in a symmetric arrangement and connected to each other by a number of cross members. Therefore, the collapsing deformation of the rear side members 4 are performed in an all the more controlled manner, and the impact load can be absorbed in a highly efficient manner.

Second Embodiment

Figure 5A:
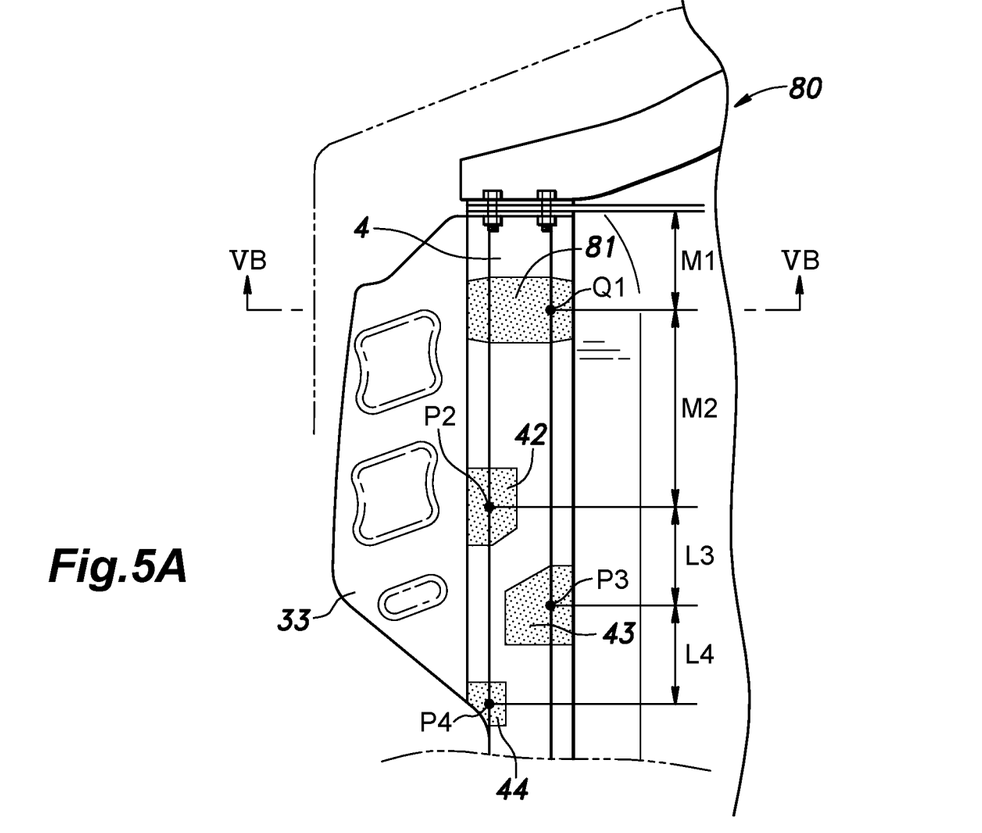
FIG. 5A is a fragmentary plan view of a right rear end part of the vehicle body rear structure according to a second embodiment of the present invention.
Figure 5B:
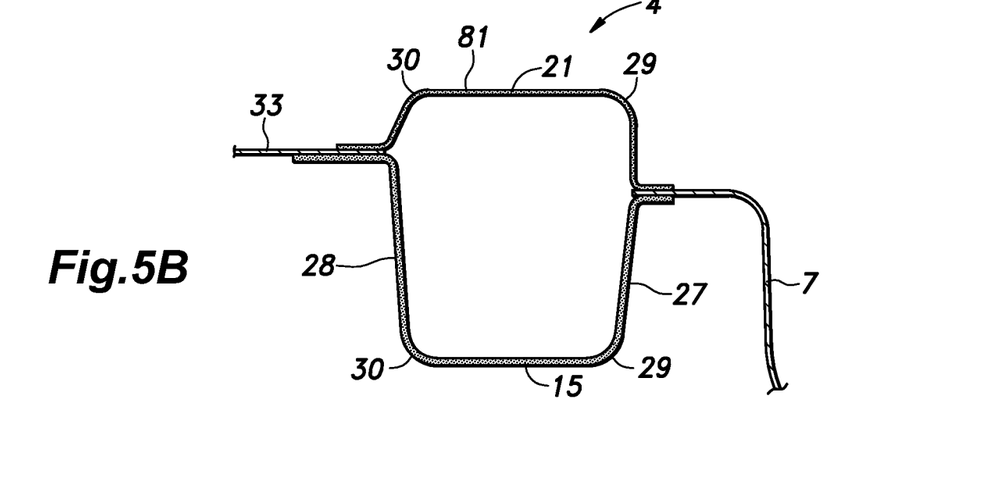
FIG. 5B is a sectional view taken along line VB-VB of FIG. 5A.

As shown in FIG. 5A, a vehicle body rear structure 80 according to a second embodiment of the present invention differs from that of the first embodiment in the configuration of the first deformable portion 81, and but is otherwise similar to that of the first embodiment. In the cross sectional view of FIG. 5B, the first deformable portion 41 is indicated by a halftone area which extends over the entire cross section. In the second embodiment, the first deformable portion 81 extends over the entire circumference of the rear side member 4, and the front edge and the rear edge thereof extend in a plane orthogonal to the axial direction of the rear side member 4. Thus, the first deformable portion 81 extends through the upper wall 21, the inner vertical wall 27, the outer vertical wall 28, the lower wall 15, the ridge lines 29 on the inboard side, and the ridge lines 30 on the outboard side. The middle point of the part of the upper ridge line 29 on the inboard side which is contained in the first deformable portion 81 is named as Q1.

As shown in FIG. 5A, the fore and aft distance M1 between the rear end Z of the rear side member 4 and Q1, the fore and aft distance M2 between Q1 and P2, the fore and aft distance L3 between P2 and P3, and the fore and aft distance L4 between P3 and P4 are substantially 1:2:1:1 in ratio.

The advantages of the vehicle body rear structure 80 configured as described above will be discussed in the following. When a rear end crash load is applied to the rear side member 4, deformation is initiated in the first deformable portion 81 and the second deformable portion 42 which are located at the two ends of the relatively long straight section (between Q1 and P2), and most remote from the vehicle occupant. Further, owing to the fact that the distances M1, M2, L3 and L4 are in the 1:2:1:1 ratio, the rear side member 4 can be collapsed in the axial direction in a controlled manner as in the first embodiment. As a result, the rear side member 4 is prevented from being deflected in the lateral direction to an excessive degree so that the impact load can be absorbed in an efficient manner. Additionally, the vehicle occupant is protected in a favorable manner at the time of a rear end crash because the deformation of the rear side member 4 is initiated in a part of the rear side member 4 remote from the vehicle occupant.

At the time of a rear end crash, the rear end part of the rear side member 4 is subjected to a greater axial load than more forward parts of the rear side member 4. Therefore, by having the first deformable portion 81 extend over the entire circumference of the rear side member 4, and providing a comparatively large size to the first deformable portion 81, the impact load of a rear end crash can be particularly favorably absorbed.

Figure 6A:
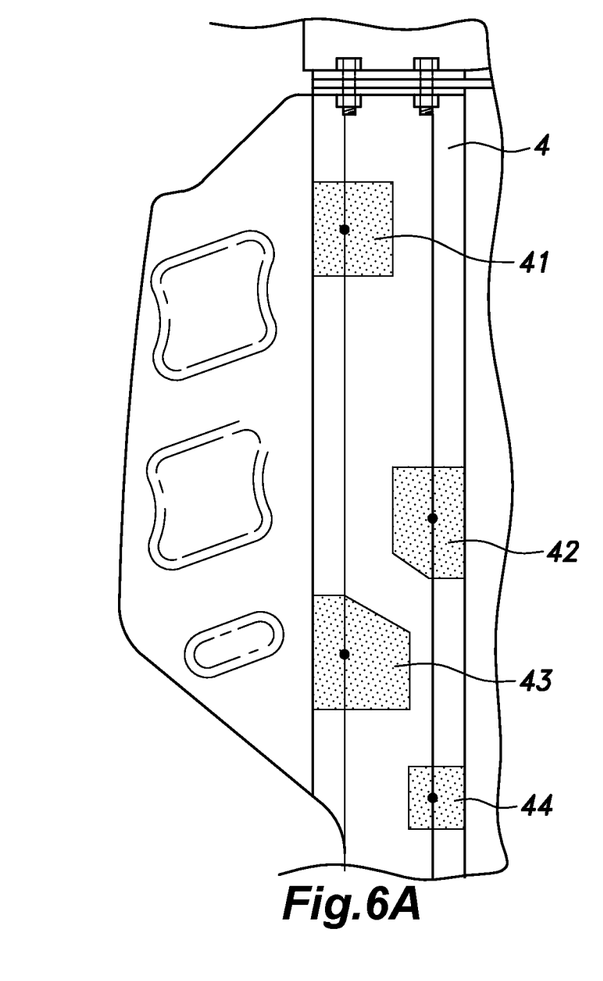
FIG. 6A is a view similar to FIG. 5A showing a modified embodiment of the present invention.

The present invention has been described in terms of specific embodiments, but is not limited by such embodiments, and can be modified in various ways without departing from the spirit of the present invention. For instance, the arrangement of the deformable portions may be laterally reversed from that of the first embodiment. More specifically, in an alternate embodiment, as shown in FIG. 6A, the first deformable portion 41 and the third deformable portion 43 are respectively arranged along the outboard side of the rear side member 4, and the second deformable portion 42 and the fourth deformable portion 44 are arranged along the inboard side of the rear side member 4.

Figure 6B:
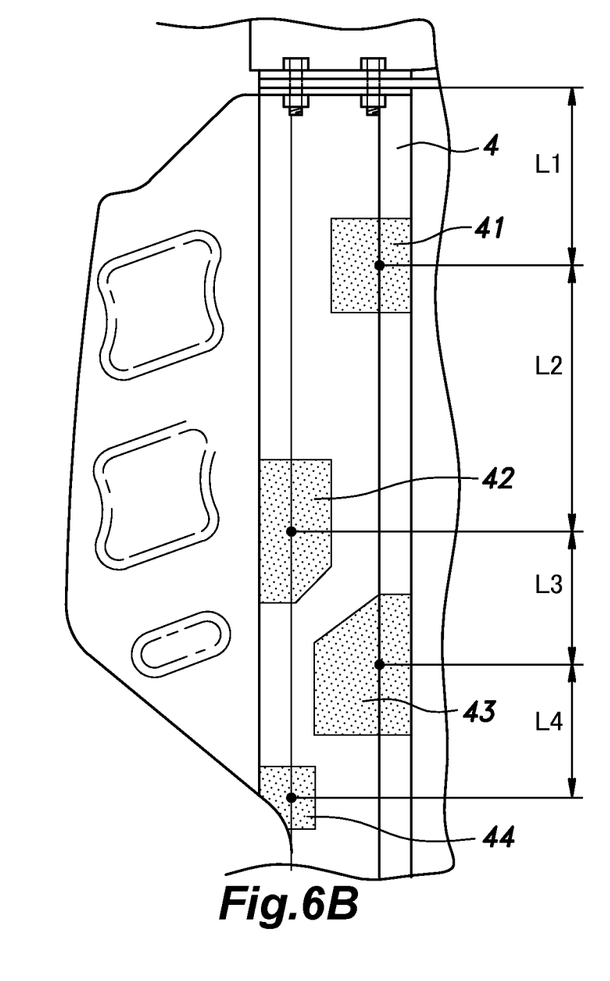
FIG. 6B is a view similar to FIG. 5A showing another modified embodiment of the present invention.

The 1:2:1:1 ratio adopted in the foregoing embodiments is not required to be exact according to a broad concept of the present invention as long as L2 is greater than any of L1, L3 and L4. For instance, L1, L2, L3 and L4 may be 1:1.5:0.75:0.75 as shown in FIG. 6B.

The 1:2:1:1 ratio adopted in the foregoing embodiments is not required to be exact, and may have a tolerance range of about 10%. For instance, the ratio may be 0.9:2:1:1, 1.1:2:1:1 or 1:1.8:1:1, and so forth.

In the foregoing embodiments, the deformable portions 40 were formed as softened portions created by locally varying the degree of quenching, but may also be formed as perforated regions, suitable embossed regions, reduced thickness regions, and so forth.

Figure 7:
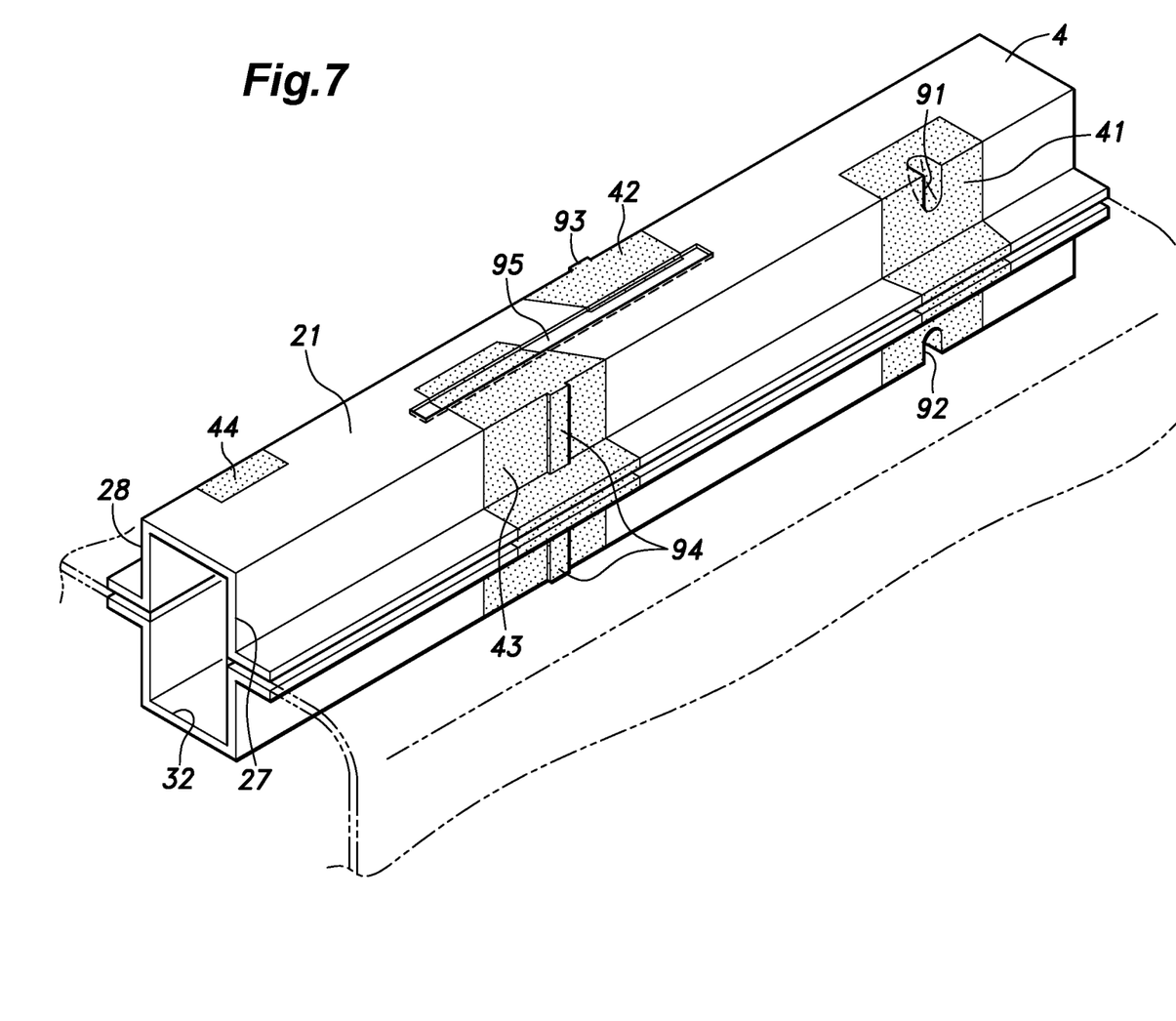
FIG. 7 is a perspective view of a rear side member according to yet another modified embodiment of the present invention.

In an alternate embodiment illustrated in FIG. 7, additionally or alternatively, the first deformable portion 41 includes a recess 91 which is formed on the upper ridge line on the inboard side, and another recess 92 which is formed on the lower ridge line on the inboard side. In the second deformable portion 42, a vertically elongated bead 93 is formed on the outer vertical wall 28 over the entire height thereof. In the third deformable portion 43, another vertically elongated bead 94 is formed on the inner vertical wall 27 over the entire height thereof. A bead 95 extending in the fore and aft direction is formed centrally in each of the upper wall 21 and the lower wall 32. These beads promote the controlled deformation of the first to third deformable portions 41, 42 and 43.

In the embodiment illustrated in FIG. 7, each fore and aft bead 95 extends through and slightly beyond each of the second deformable portion 42 and the third deformable portion 43. These beads 95 help the section of the rear side member 4 located between the second deformable portion 42 and the third deformable portion 43 remain relatively straight in the collapsing deformation of the rear side member 4.

The invention claimed is:

1. A vehicle body rear structure including a pair of rear side members extending in a fore and aft direction along either side of a vehicle body, wherein
   each rear side member includes a first deformable portion, a second deformable portion, a third deformable portion, and a fourth deformable portion in that order from a rear end thereof on an inboard side and an outboard side in an alternating manner and in a mutually spaced apart relationship,
   a distance between the first deformable portion and the second deformable portion is greater than any of a distance between the rear end of the rear side member and the first deformable portion, a distance between the second deformable portion and the third deformable portion, and a distance between the third deformable portion and the fourth deformable portion,
   each rear side member is formed as a tubular member having a rectangular cross section so as to have a pair of ridge lines on an inboard side and another pair of ridge lines on an outboard side,
   the first deformable portion and the third deformable portion extend through the ridge lines on the inboard side, and
   the second deformable portion and the fourth deformable portion extend through the ridge lines on the outboard side.

2. The vehicle body rear structure according to claim 1, wherein the distance between the rear end of the rear side member and the first deformable portion, the distance between the first deformable portion and the second deformable portion, the distance between the second deformable portion and the third deformable portion, and the distance between the third deformable portion and the fourth deformable portion are substantially 1:2:1:1 in ratio.

3. The vehicle body rear structure according to claim 1, wherein a front edge of the second deformable portion on an upper wall of the rear side member is inclined rearward toward the inboard side, and a rear edge of the third deformable portion on the upper wall of the rear side member is inclined forward toward the outboard side, the front edge of the second deformable portion and the rear edge of the third deformable portion being spaced apart from each other in the fore and aft direction in a mutually parallel relationship.

4. The vehicle body rear structure according to claim 1, wherein each rear side member is made of metallic material, and each deformation portion consists of a softened portion of the rear side member.

5. The vehicle body rear structure according to claim 1, wherein the rear side members are symmetric to each other.

6. A vehicle body rear structure including a pair of rear side members extending in a fore and aft direction along either side of a vehicle body, wherein
   each rear side member includes a first deformable portion, a second deformable portion, a third deformable portion, and a fourth deformable portion in that order from a rear end thereof in a mutually spaced apart relationship,
   the first deformable portion extends over an entire circumference of the rear side member, the second deformable portion, the third deformable portion, and the fourth deformable portion being provided on an inboard side and an outboard side in an alternating manner,
   a distance between the first deformable portion and the second deformable portion is greater than any of a distance between the rear end of the rear side member and the first deformable portion, a distance between the second deformable portion and the third deformable portion, and a distance between the third deformable portion and the fourth deformable portion, and
   the distance between the rear end of the rear side member and the first deformable portion, the distance between the first deformable portion and the second deformable portion, the distance between the second deformable portion and the third deformable portion, and the distance between the third deformable portion and the fourth deformable portion are substantially 1:2:1:1 in ratio.

7. A vehicle body rear structure including a pair of rear side members extending in a fore and aft direction along either side of a vehicle body, wherein each rear side member includes a first deformable portion, a second deformable portion, a third deformable portion, and a fourth deformable portion in that order from a rear end thereof on an inboard side and an outboard side in an alternating manner and in a mutually spaced apart relationship, a distance between the first deformable portion and the second deformable portion is greater than any of a distance between the rear end of the rear side member and the first deformable portion, a distance between the second deformable portion and the third deformable portion, and a distance between the third deformable portion and the fourth deformable portion, and the distance between the rear end of the rear side member and the first deformable portion, the distance between the first deformable portion and the second deformable portion, the distance between the second deformable portion and the third deformable portion, and the distance between the third deformable portion and the fourth deformable portion are substantially 1:2:1:1 in ratio.

\* \* \* \* \*